(12) United States Patent
Zhao et al.

(10) Patent No.: US 7,836,294 B2
(45) Date of Patent: Nov. 16, 2010

(54) MOBILE STATION SECURITY MODE METHOD

(75) Inventors: Hui Zhao, Lindenhurst, IL (US); Padmaja Putcha, Gurnee, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1314 days.

(21) Appl. No.: 11/199,348

(22) Filed: Aug. 8, 2005

(65) Prior Publication Data

US 2007/0033411 A1 Feb. 8, 2007

(51) Int. Cl.
*H04L 29/06* (2006.01)
(52) U.S. Cl. ...................................... 713/151
(58) Field of Classification Search ................. 713/151
See application file for complete search history.

(56) References Cited

U.S. PATENT DOCUMENTS

| | | | |
|---|---|---|---|
| 7,116,984 B1 * | 10/2006 | Muhonen et al. | 455/456.1 |
| 2002/0066011 A1 * | 5/2002 | Vialen et al. | 713/150 |
| 2003/0050076 A1 | 3/2003 | Watanabe | |
| 2003/0100291 A1 | 5/2003 | Krishnarajah et al. | |
| 2003/0236085 A1 | 12/2003 | Ho | |
| 2004/0185837 A1 * | 9/2004 | Kim et al. | 455/414.3 |
| 2004/0246918 A1 * | 12/2004 | Evensen | 370/328 |
| 2005/0003819 A1 * | 1/2005 | Wu | 455/436 |

FOREIGN PATENT DOCUMENTS

WO 0245453 A1 6/2002

OTHER PUBLICATIONS

3rd Generation Partnership Project; Technical Specification Group Core Network and Terminals; Mobile Radio Interface Layer 3 Specification; Core Network Protocols; Stage 3 (Release 6); 3GPP TS 24.008 V6.9.0 (Jun. 2005) pp. 1-22, 37-39.
3rd Generation Partnership Project; Technical Specification Group Radio Access Network; Radio Resource Control (RRC); Protocol Specification (Release 6) 3GPP TS 25.331 V6.6.0 (Jun. 2005)pp. 1-28, 245.

(Continued)

*Primary Examiner*—Kambiz Zand
*Assistant Examiner*—Teshome Hailu
(74) *Attorney, Agent, or Firm*—Sylvia Chen

(57) ABSTRACT

A security mode method (200) receives (210) a layer 3 message in a first domain from a network, determines (220) if the layer 3 message has integrity protection information, ascertains (240) if a security mode has been initiated in the first domain, and forwards (260) the layer 3 message to an upper layer, if the layer 3 message lacks integrity protection information and a security mode has not been initiated in the first domain even if security mode has been initiated in a second domain. This method allows a mobile station to process a non-integrity-protected layer 3 message from one domain even if integrity protection has been initiated in another domain. When packet-switched and circuit-switched connections are being concurrently set up, a non-integrity-protected message in one domain may arrive at a mobile station after an integrity protection initiation message in another domain.

19 Claims, 6 Drawing Sheets

OTHER PUBLICATIONS

Japan Patent Office; "Office Action" for Application No. 2006-202876; dated Jan. 13, 2009; 4 pages.

Patent Cooperation Treaty; "PCT Notification of the International Search Report and the Written Opinion of the International Searching Authority, or the Declaration" for Application No. PCT/US2006/025857; dated Feb. 23, 2007; 15 pages.

European Patent Office; "Extended European Search Report" for Application No. 06014566.1-2413; dated Feb. 28, 2007; 9 pages.

Japan Patent Office; "Office Action" for Application No. 2006-202876; dated Aug. 18, 2009; 2 pages.

European Patent Office, "Communication" for EPC Application No. 09015157.2, Jan. 19, 2010, pp. 1-5.

* cited by examiner

300

500

600

MOBILE STATION SECURITY MODE METHOD

FIELD OF THE DISCLOSURE

This disclosure relates generally to radiotelephone communications and, in particular, integrity checking of signaling messages at a mobile station.

BACKGROUND OF THE DISCLOSURE

According to Third Generation Partnership Project (3GPP) Technical Specification 25.331, a variable INTEGRITY_PROTECTION_INFO indicates the status of integrity protection in a mobile station (MS) at the radio resource control (RRC) layer. The status of integrity protection can be either "not started" or "started." If the variable INTEGRITY_PROTECTION_INFO has the value "started," any RRC message received by the MS will be checked for an information element (IE) "Integrity check info." If the IE "Integrity check info" is not present, the MS shall discard the message.

According to 3GPP Technical Specification 24.008, integrity protected signaling is mandatory when a mobile station is in a UMTS connected mode with a network. There are some key exceptions, however, to the requirement that all layer 3 signaling messages be integrity protected. For example, circuit-switched (CS) domain "authentication request" and packet-switched (PS) domain "authentication & ciphering request" messages do not need to be integrity protected. Thus, these types of messages may be missing the IE "Integrity check info."

When CS-domain and PS-domain connections between a network and a mobile station are being concurrently set-up, one domain's non-integrity-protected layer 3 message may be received at the mobile station after another domain's message initiating integrity protection. The 3GPP Technical Specification 25.331 requirement can result in an MS discarding the non-integrity-protected layer 3 message. The consequence of this discarding may results in an inability to complete a call. For example, if a CS-domain "authentication request" message (and its copies) is consistently discarded by the MS, then the call cannot complete and will eventually drop.

In other words, when a non-integrity-protected layer 3 message in one domain is received by an MS after a command to start integrity protection in another domain, the MS discards the non-integrity-protected layer 3 message. On the other hand, if the same non-integrity-protected layer 3 message in one domain was received by the MS before the command to start integrity protection in another domain, then the MS properly processes the non-integrity-protected layer 3 message. Because RRC messages (Access Stratum) and layer 3 messages (Non-Access Stratum) use different radio bearers and have different priorities, there is a real risk that a non-integrity-protected message for one domain and an integrity protection initiation message for another domain will be received out-of-order by an MS.

There is an opportunity for an MS to process out-of-order non-integrity-protected layer 3 and integrity protection initiation messages to reduce the number of dropped calls. The various aspects, features and advantages of the disclosure will become more fully apparent to those having ordinary skill in the art upon careful consideration of the following Drawings and accompanying Detailed Description.

DETAILED DESCRIPTION

In both the circuit-switched (CS) and the packet-switched (PS) domains, a core network may initiate a non-integrity-protected layer 3 signaling message before initiating a radio resource control (RRC) message to start integrity protection. When both a CS core network and a PS core network are concurrently establishing a connection with a mobile station (MS), a non-integrity-protected layer 3 signaling message for one domain may arrive at an MS either before or after an integrity protection initiation message for another domain. Because RRC messages (Access Stratum) and layer 3 messages (Non-Access Stratum) are sent with different priorities on different radio bearers, there is a real risk that an MS will receive a non-integrity-protected layer 3 signaling message for one domain after receiving a RRC message (Access Stratum) to start integrity protection in another domain.

A mobile station security mode method receives a layer 3 message in either the packet-switched (PS) or circuit-switched (CS) domain, determines if the layer 3 message is integrity protected, determines if integrity protection has been initiated in that domain, and forwards the layer 3 message to the proper domain's mobility management layer in the MS if the layer 3 message is not integrity protected and integrity protection has not been initiated in that domain. If integrity protection has been initiated in that domain, then the layer 3 message is discarded. This method accommodates a situation where an MS receives a non-integrity-protected layer 3 message for one domain after receiving an integrity protection initiation message in another domain.

Figure 1:
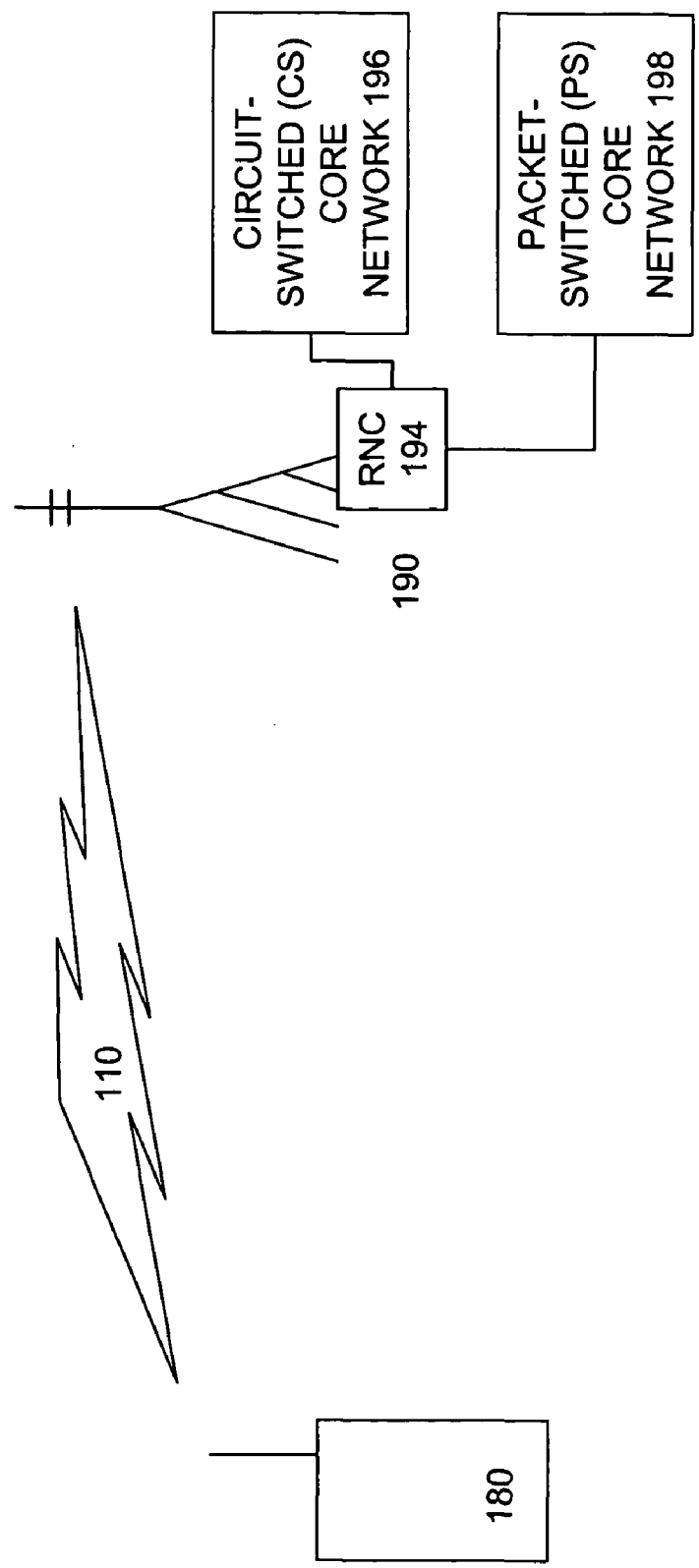
FIG. 1 shows a simplified 3GPP system with a mobile station and a network according an embodiment.

FIG. 1 shows a simplified 3GPP system 100 with a mobile station 180 and a network 190 according to an embodiment. In the embodiments discussed, a 3GPP wireless communication system is shown; however, the principles disclosed may be applied to other types of wireless communication systems including future versions of the 3GPP system. The mobile station 180, sometimes referred to as a mobile device or user equipment (UE), can be a radiotelephone, laptop with wireless connection, wireless messaging device, or other type of wireless communication device compatible with the network 190.

The network 190 includes a circuit-switched (CS) core network 196 as well as a packet-switched (PS) core network 198. The CS core network 196 and the PS core network 198 operate independently of each other. For example, the PS core network may initiate integrity protection at one time, and the CS core network may initiate integrity protection at a later time that is not coordinated with the PS core network integrity protection initiation. The CS core network 196 and the PS core network 198 come together at a Radio Network Controller (RNC) 194 radio resource control (RRC) and a radio link control (RLC) entity within the network 190 and thus both PS and CS messages are transmitted across a wireless communication link 110 to the mobile station 180. The mobile station 180 communicates to the network 190 across the wireless communication link 110 also.

Figure 2:
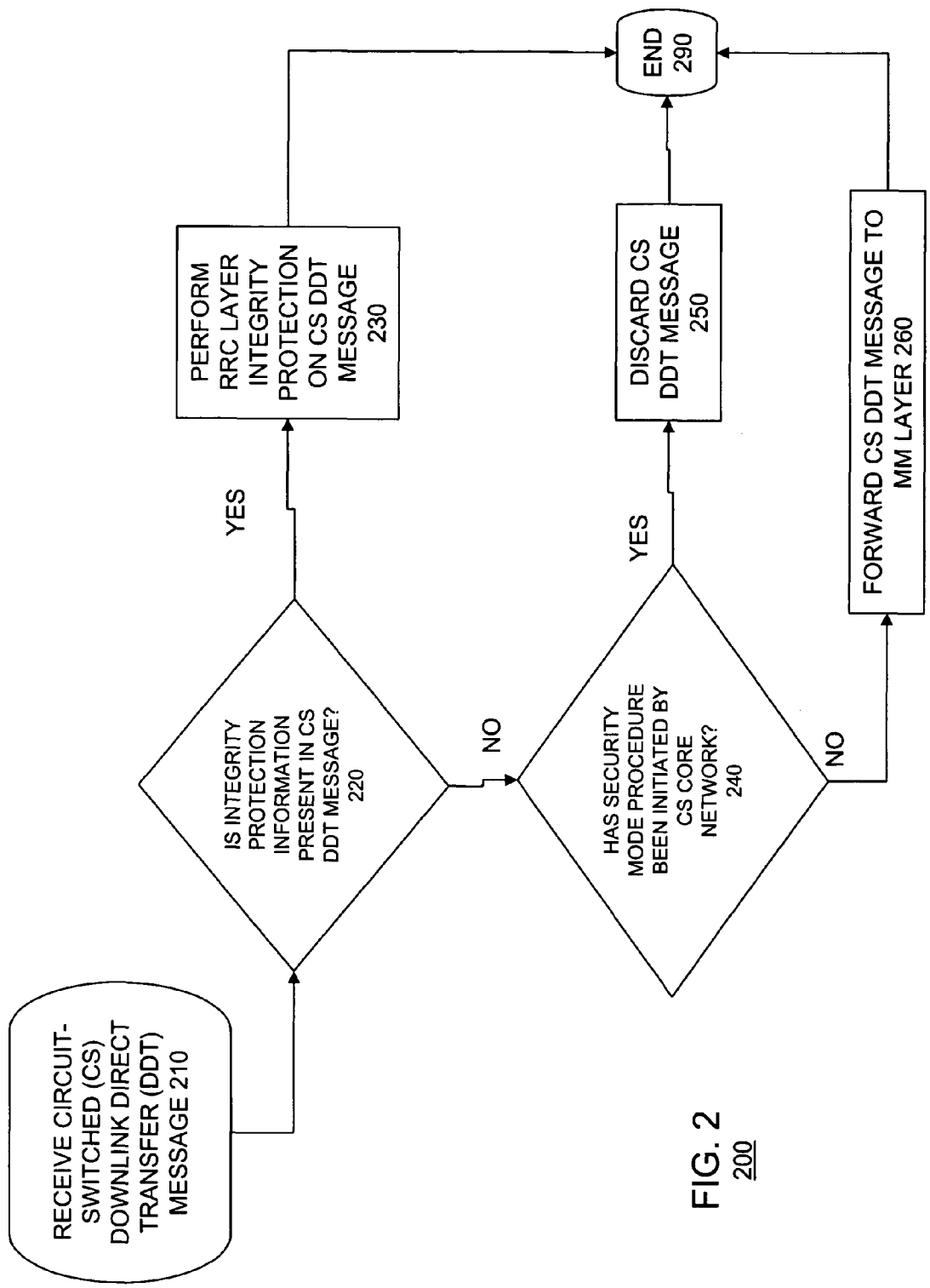
FIG. 2 shows a flowchart of a security mode method for the mobile station shown in FIG. 1 according to a first embodiment.

FIG. 2 shows a flowchart 200 of a security mode method for the mobile station 180 shown in FIG. 1 according to a first embodiment. In step 210, the mobile station 180 receives circuit-switched (CS) layer 3 downlink direct transfer (DDT) message from a network such as network 190 shown in FIG. 1. The CS DDT message could be an authentication request message, an authentication reject message, an identity request message, a location updating accept message, a location updating reject message, an abort message, or one of several other types of layer 3 messages. In step 220, the mobile station 180 determines whether integrity protection information is present in the CS DDT message. According to 3GPP Technical Specification 25.331, an information element (IE) "Integrity check info" conveniently indicates whether integrity check information is in the layer 3 message. In this embodiment, if the IE "Integrity check info" is present, then there is integrity protection information present in the CS DDT message in accordance with step 220. If integrity protection information is present, step 230 performs standard RRC layer integrity protection on the CS DDT message and the flow ends at step 290.

If integrity protection information is not present in the CS DDT message, step 240 determines if an integrity protection security mode procedure has been initiated by the CS core network. If the mobile station 180 has received a CS security mode command message to start integrity protection, then an integrity protection security mode procedure has been initiated by the CS core network and step 250 discards the CS DDT message before the flow ends at step 290. Discarding the CS DDT message under these conditions complies with the requirements of 3GPP Technical Specification 25.331. Alternately, if the variable INTEGRITY_PROTECTION_INFO was modified to include separate started and non-started statuses for the CS and the PS domains, step 240 could be determined by checking the INTEGRITY_PROTECTION_INFO variable of the mobile station.

If step 240 determines that an integrity protection security mode procedure has not been initiated by the CS core network (e.g., a security mode has only been initiated by the PS core network or that neither core network has initiated a security mode), step 260 forwards the CS DDT message to the circuit-switched mobility management (MM) layer of the mobile station 180 before the flow ends at step 290. Because 3GPP Technical Specification 24.008 provides flexibility to process a non-integrity-protected layer 3 message in a particular domain when integrity protection for that domain has not been initiated, the flowchart 200 prevents a call from being dropped when a layer 3 signaling message and an integrity protection initiation message are received out-of-order.

Figure 3:
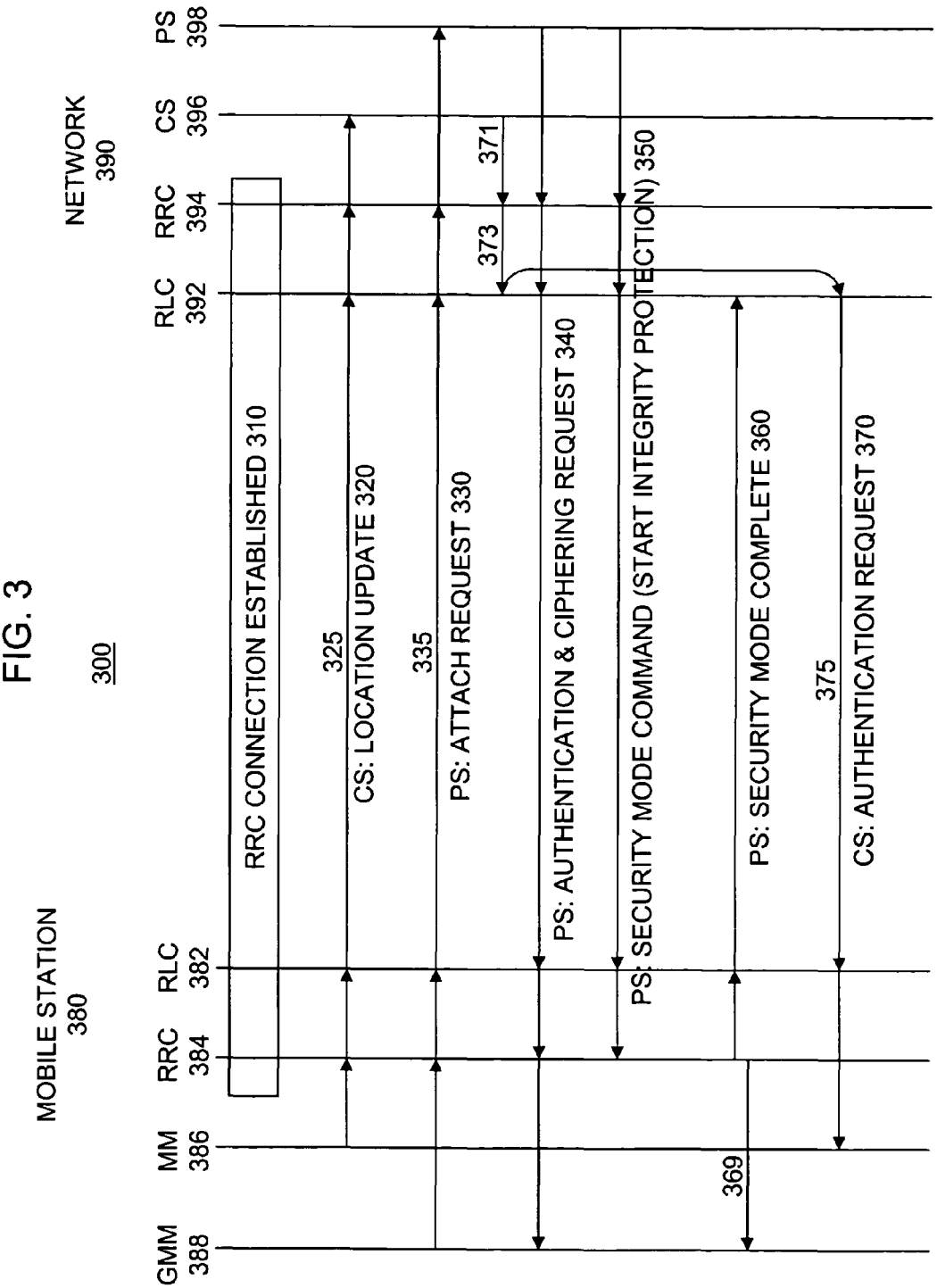
FIG. 3 shows a first example signal flow diagram for a security mode method in the 3GPP system shown in FIG. 1 according to the first embodiment.

FIG. 3 shows a first example signal flow diagram 300 for a security mode method in the 3GPP system 100 shown in FIG. 1 according to the first embodiment. In this first example, a non-integrity-protected CS authentication request message 370 is initiated by a CS core network 396 before an integrity protection initiation message 350 is initiated by a PS core network, but the non-integrity-protected message 370 is received at the mobile station 380 after the integrity protection initiation message 350 is received at the mobile station 380. In this example, where a mobile station 380 is initiating a call, instead of discarding the non-integrity-protected CS authentication request message 370, the mobile station 380 passes the message 370 to its circuit-switched domain mobility management (MM) layer 386.

This first example signal flow diagram 300 shows four layers in a mobile station 380: a radio link control (RLC) layer 382, a radio resource control (RRC) layer 384, a circuit-switched domain mobility management (MM) layer 386, and a packet-switched domain GPRS mobility management (GMM) layer 388. The RLC and RRC layers 382, 384 are considered "lower" layers, while the MM and GMM layers 386, 388 are considered "upper" layers. The MM layer 386 used in the CS domain is analogous to the GMM layer 388 in the PS domain; both are mobility management layers.

Four layers of a network 390 are also shown in the first example signal flow diagram 300. The network 390 has a radio link control (RLC) layer 392 and a radio resource control (RRC) layer 394 which are counterparts to the RLC and RRC layers 382, 384 in the mobile station 380. The network 390 also has a CS core network 396 and a PS core network 398, which are shown in FIG. 1 as CS core network 196 and PS core network 198. As stated previously, the CS core network 396 and the PS core network 398 operate independently of each other.

After an RRC connection is established between the mobile station 380 and the network 390 using various messages 310, a CS location update message 320 is generated by the circuit-switched MM layer 386 and passed to the RRC layer 384, repackaged for the RLC layer 382, and transmitted from the RLC layer of the mobile station 380 as message 325. Message 325 is received at the RLC layer 392 of the network, converted and sent to the RRC layer 394, which forwards the message to the CS core network 396 for processing. On the packet-switching side, an attach request message 330 is generated at the packet-switched GMM layer 388, repackaged at the RRC layer 384, and transmitted from the mobile station 380 through the RLC layer 382 as message 335. The RLC layer 392 of the network 390 receives the message 335 and converts it for the RRC layer 394, which then processes it and forwards it to the PS core network 398. The CS location update message 320 and the PS attach request message 330 are not coordinated with each other and can occur in any time sequence.

In response to the CS location update message 320, the network 390 sends a non-integrity-protected CS authentication request message 370 followed by a CS security mode command (not shown) to start integrity protection. The authentication request is generated by the CS core network 396 as message 371, and packaged by the RRC layer 394 as message 373. Depending on the size and priority of the message 373, some time may elapse before the RLC layer 392 of the network 390 transmits a non-integrity-protected message 375 containing the CS authentication request message 370. In the meantime, in response to the attach request message 330, the PS core network 398 has initiated an authentication & ciphering request message 340 followed by a security mode command 350 to start integrity protection. The mobile station 380 starts integrity protection and prepares a security mode complete message 360 to the RLC layer 382 when the security mode procedures are complete at the mobile station 380. Meanwhile, the packet-switched GMM layer 388 is also notified that the PS security mode has been completed using message 369 from the RRC layer 384.

So when the non-integrity-protected message 375 bearing a circuit-switched domain authentication request message 370 from the network 390 arrives at the mobile station 380, the mobile station 380 is in security mode for the PS domain. Using the flowchart 200 shown in FIG. 2, the mobile station 380 determines that the message 375 does not contain integrity protection information, that integrity protection has not been initiated in the CS domain, and thus forwards the CS authentication request to the circuit-switched MM layer 386. Generally speaking, the authentication request message 370 would be followed by a circuit-switched security mode command message to start integrity protection.

Without the flowchart 200 shown in FIG. 2, the CS-domain authentication request message 375 would have been discarded by the mobile station 380 because the message 375 did not contain integrity protection information and a security mode had been initiated. Discarding this message 375 (and its copies) would have eventually resulted in a dropped call.

Figure 4:
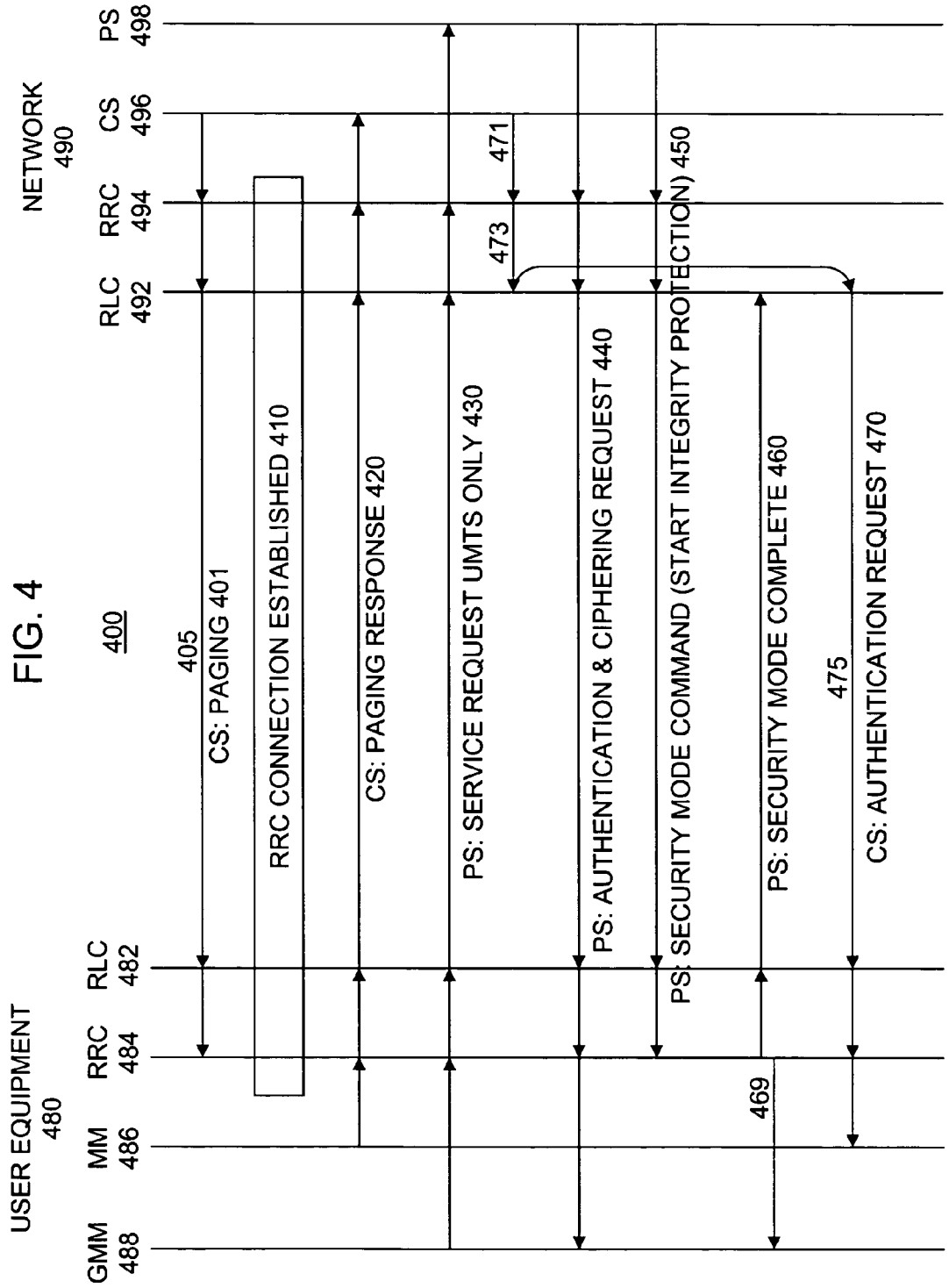
FIG. 4 shows a second example signal flow diagram for a security mode method in the 3GPP system shown in FIG. 1 according to the first embodiment.

FIG. 4 shows a second example signal flow diagram 400 for a security mode method in the 3GPP system 100 shown in FIG. 1 according to the first embodiment. In this second example, where a mobile station 480 is being paged in preparation to receive an incoming call, a non-integrity-protected CS authentication request message 470 is initiated by a CS core network 496 before a PS integrity protection initiation message 450 is initiated, but the non-integrity-protected message 470 is received at the mobile station 480 after the integrity protection initiation message 450 is received at the mobile station 480. In this example, instead of discarding the non-integrity-protected CS authentication request message 470, the mobile station 480 passes the message 470 to its circuit-switched mobility management layer 486.

This second example signal flow diagram 400 shows four layers of a mobile station 480: a radio link control (RLC) layer 482, a radio resource control (RRC) layer 484, a circuit-switched mobility management (MM) layer 486, and a packet-switched domain GPRS mobility management (GMM) layer 488. Four layers of network 490 are also shown in the second example signal flow diagram 400. The network 490 has a radio link control (RLC) layer 492 and a radio resource control (RRC) layer 494 which are counterparts to the RLC and RRC layers 482, 484 in the mobile station 480. The network 490 also has a CS core network 496 and a PS core network 498, which are shown in FIG. 1 as CS core network 196 and PS core network 198. As stated previously, the CS core network 496 and the PS core network 498 operate independently of each other.

Initially, the CS core network 496 sends a paging message 401 through the RRC layer 494 to the RLC layer 492, which transmits it as message 405. The RLC layer 482 of the mobile station 480 converts the received message 405 and passes it to the RRC layer 484. Subsequently, messages establish an RRC connection 410 between the mobile station 480 and the network 490.

The mobile station 480 then provides a CS paging response message 420 from the MM layer 486 to the RRC layer 484, which is converted to a message for the RLC layer 482 and transmitted to the network 490. The received CS paging response message is converted by the RLC layer 492 and sent to the RRC layer 494 and finally reaches the CS core network 496. Meanwhile, the GMM layer 488 of the mobile station 480 prepares a PS service request message 430 for UMTS service only. The initial message from the GMM layer 488 is converted at the RRC layer 484 and transmitted from the RLC layer 482. When the RLC layer 492 of the network 490 receives the message 430, it passes it to the RRC layer 494, which in turn passes a form of the message to the PS core network 498.

Although the CS paging response message 420 and the PS service request message 430 are uncoordinated relative to each other, a subsequent CS authentication request message 470 followed by a CS security mode command (not shown) is triggered by the receipt of the CS paging response message 420 at the network 490. After the CS paging response message 420 is processed by the CS core network 496, the CS core network 496 responds with a CS authentication request message 470. This message starts as a message 471 from the CS core network 496, gets converted to a message 473 by the RRC layer 494, and may take a while for the RLC layer 492 to transmit as a message 475.

In the meantime, the PS core network 498 has responded to the PS service request message 430 with a PS authentication & ciphering request message 440 followed by a PS security mode command message 450 to start integrity protection. When the mobile station 480 receives the integrity protection initiation message 450, it passes it to the RRC layer 484. The RRC layer starts integrity protection and notifies the network 490 using a PS security mode complete message 460. The RRC layer 484 also uses a message 469 to notify the packet-switched GMM layer 488 when the security mode is complete.

The mobile station 480 then receives the CS authentication request message 470 via message 475 after the PS security mode is complete. Using the flowchart 200 shown in FIG. 2, the mobile station 480 determines that the message 475 does not contain integrity protection information, that integrity protection has not been initiated in the CS domain, and thus forwards the authentication request 470 to the circuit-switched MM layer 486. Generally speaking, the authentication request message 470 would be followed by a circuit-switched security mode command message to start integrity protection.

Without the flowchart 200 shown in FIG. 2, the CS authentication request message 475 would have been discarded by the mobile station 480 because the message 475 did not contain integrity protection information and a security mode had been initiated. Discarding this message 475 would have prevented the incoming call from ringing at the mobile station 480.

Figure 5:
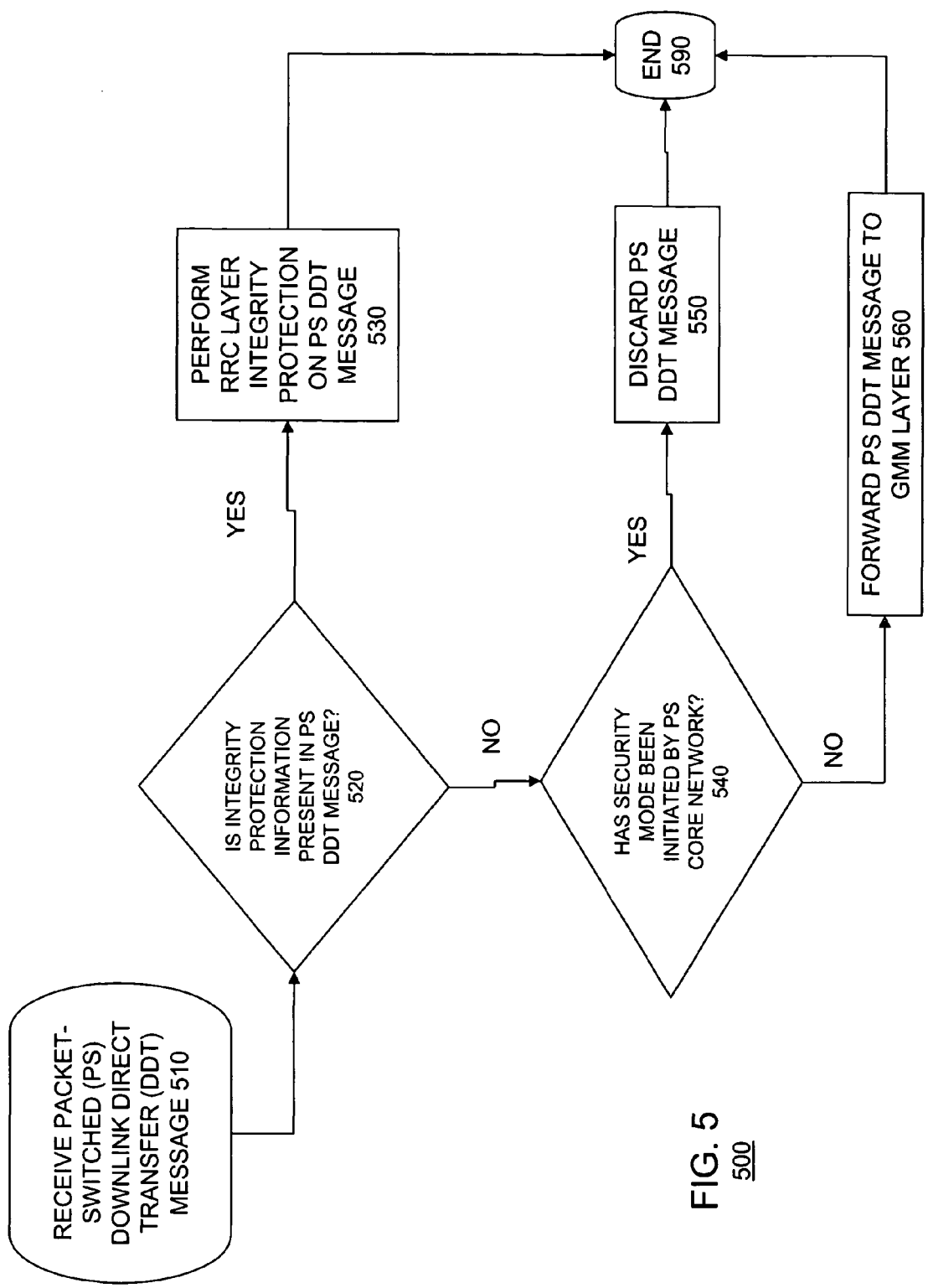
FIG. 5 shows a flowchart of a security mode method for the mobile station shown in FIG. 1 according to a second embodiment.

The concepts shown in FIG. 2 can be replicated for the PS domain. FIG. 5 shows a flowchart 500 of a security mode method for the mobile station 180 shown in FIG. 1 according to a second embodiment. In step 510, the mobile station 180 receives packet-switched (PS) layer 3 downlink direct transfer (DDT) message from a network such as network 190 shown in FIG. 1. The PS DDT message could be an authentication & ciphering request message, an authentication & ciphering reject message, an identity request message, a routing area update accept message, a routing area update reject message, a service reject message, or one of several other types of layer 3 messages. In step 520, the mobile station 180 determines whether integrity protection information is present in the PS DDT message. According to 3GPP Technical Specification 25.331, an information element (IE) "Integrity check info" conveniently records whether integrity protection information is in the layer 3 message. In this embodiment, if the IE "Integrity check info" is present, then there is integrity protection information present in the PS DDT message in accordance with step 520. If integrity protection information is present, step 530 performs standard RRC layer integrity protection on the PS DDT message and the flow ends at step 590.

If integrity protection information is not present in the PS DDT message, step 540 determines if an integrity protection security mode has been initiated by the PS core network. If the mobile station 180 has received a PS security mode command message to start integrity protection, then an integrity protection security mode has been initiated by the PS core network and step 550 discards the PS DDT message before the flow ends at step 590. Discarding the PS DDT message under these conditions complies with the requirements of 3GPP Technical Specification 25.331. Alternately, if the variable INTEGRITY_PROTECTION_INFO was modified to include separate started and non-started statuses for the CS and the PS domains, step 540 could be determined by checking the INTEGRITY_PROTECTION_INFO variable of the mobile station.

If step 540 determines that an integrity protection security mode has not been initiated by the PS core network (e.g., a security mode has only been initiated by the CS core network or that neither core network has initiated a security mode), step 560 forwards the PS DDT message to the packet-switched GMM layer of the mobile station 180 before the flow ends at step 590. Because 3GPP Technical Specification 24.008 provides flexibility to process a non-integrity-protected layer 3 message in a particular domain when integrity protection for that domain has not been initiated, the flowchart 500 prevents a call from being dropped when a layer 3 signaling message and an integrity protection initiation message are received out-of-order.

Figure 6:
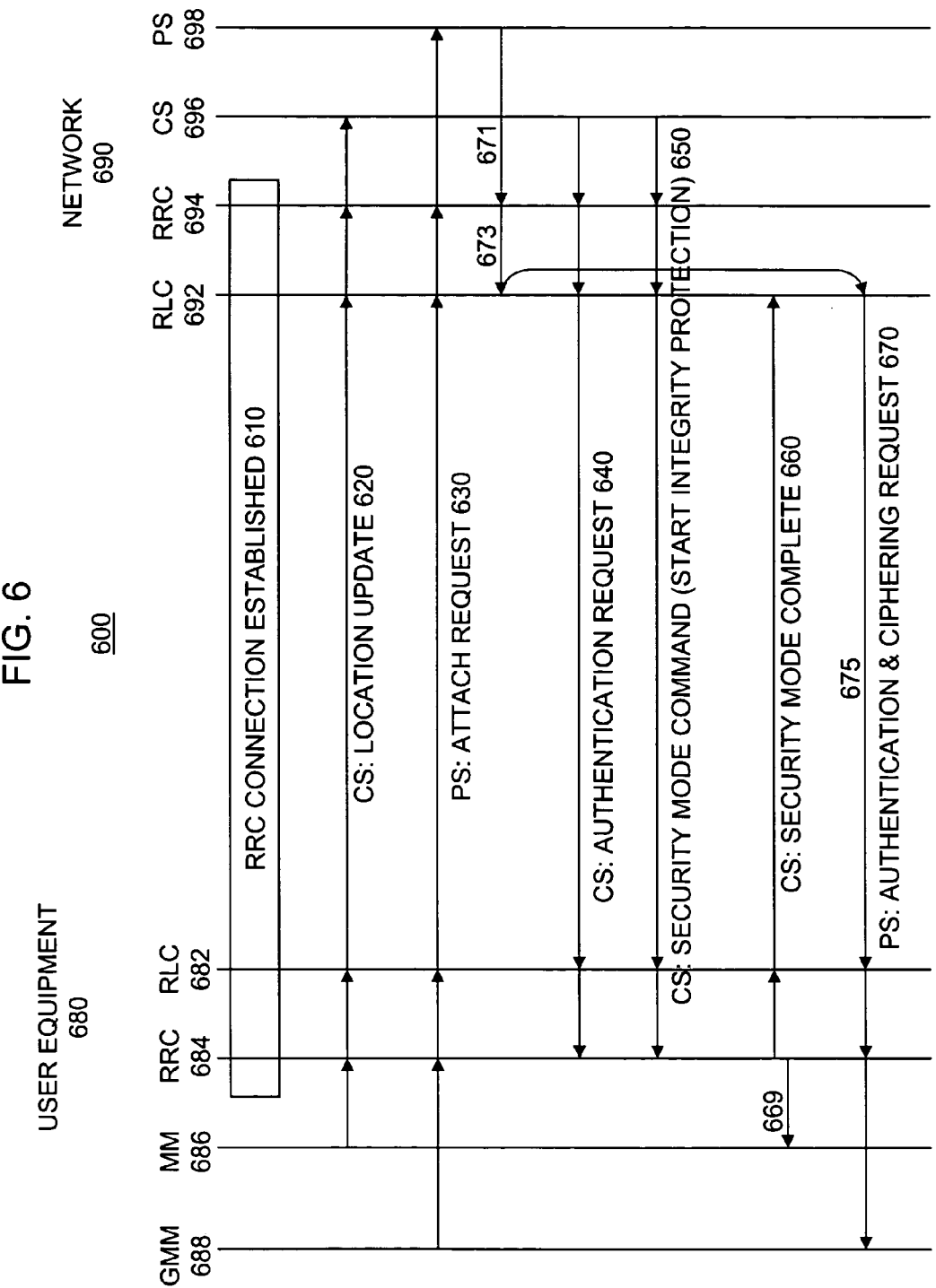
FIG. 6 shows a third example signal flow diagram for a security mode method in the 3GPP system shown in FIG. 1 according to the second embodiment.

FIG. 6 shows a third example signal flow diagram 600 for a security mode method in the 3GPP system shown in FIG. 1 according to the second embodiment. In this third example, a non-integrity-protected PS authentication & ciphering request message 670 is initiated by a PS core network 698 before an integrity protection initiation message 650 is initiated, but the non-integrity-protected message 670 is received at the mobile station 680 after the integrity protection initiation message 650 is received at the mobile station 680. In this example, where a mobile station 680 is initiating a call, instead of discarding the non-integrity-protected PS authentication & ciphering request message 670, the mobile station 680 passes the message 670 to its packet-switched domain mobility management layer, GMM layer 688.

This third example signal flow diagram 600 shows four layers of a mobile station 680: a radio link control (RLC) layer 682, a radio resource control (RRC) layer 684, a circuit-switched domain mobility management (MM) layer 686, and a packet-switched domain GPRS mobility management (GMM) layer 688. A network 690 is also shown in the third example signal flow diagram 600. The network 690 has a radio link control (RLC) layer 692 and a radio resource control (RRC) layer 694 which are counterparts to the RLC and RRC layers 682, 684 in the mobile station 680. The network 690 also has a CS core network 696 and a PS core network 698, which are shown in FIG. 1 as CS core network 196 and PS core network 198. As stated previously, the CS core network 696 and the PS core network 698 operate independently of each other.

After an RRC connection is established between the mobile station 680 and the network 690 using various messages 610, a CS location update message 620 is generated by the MM layer 686 passed to the RRC layer 684 for repackaging, and transmitted from the RLC layer 682 of the mobile station 680. The message 620 is received at the RLC layer 692 of the network, converted and sent to the RRC layer 694, which forwards the message to the CS core network 696 for processing. In the packet-switching domain, an attach request message 630 is generated at the GMM layer 688, repackaged at the RRC layer 684, and transmitted from the mobile station 680 through the RLC layer 682. The RLC layer 692 of the network 690 receives the message 630, converts it for the RRC layer 694, which forwards it to the PS core network 698. The CS location update message 620 and the PS attach request message 630 are not coordinated with each other and they can occur in any time sequence.

In response to the PS attach request message 630, the network 690 sends a PS authentication & ciphering request message 670. The authentication & ciphering request is generated by the PS core network 698 as message 671, and packaged by the RRC layer 694 as message 673. Depending on the size and priority of the message 673, some time may elapse before the RLC layer of the network 690 transmits a non-integrity-protected message 675 containing the PS authentication & ciphering request message 670.

In the meantime, in response to the CS location update message 620, the CS core network 696 has sent a CS authentication request message 640 followed by a CS security mode command message 650 directing the start of integrity protection. When the CS security mode command message 650 is received by the mobile station 680 at the RLC layer 682 and passed to the RRC layer 684, the mobile station 680 initiates the integrity protection. When the security mode procedures are complete at the mobile station 680, a security mode complete message 660 is sent to the network 690. Meanwhile, the circuit-switched domain MM layer 686 is also notified that the CS security mode has been completed using message 669 from the RRC layer 684.

So when the non-integrity-protected message 675 bearing an authentication & ciphering request message 670 from the network 690 arrives at the mobile station 680, the mobile station 680 is in security mode for the CS domain. Using the flowchart 500 shown in FIG. 5, the mobile station 680 determines that the message 675 does not contain integrity protection information, that integrity protection has not been initiated in the PS domain, and thus forwards the PS authentication & ciphering request message 670 to the GMM layer 688. Generally speaking, the authentication & ciphering request message 670 would be followed by a packet-switched security mode command message to start integrity protection.

Without the flowchart 500 shown in FIG. 5, the packet-switched domain authentication & ciphering request message 675 would have been discarded by the mobile station 680 because the message 675 did not contain integrity protection information and a security mode had been initiated. Discarding this message 675 (and its copies) would have eventually resulted in a dropped call.

Thus, a security mode method complies with 3GPP technical specifications and yet differentiates between security modes in different domains. If a mobile device receives a message without integrity protection in one domain, and it is determined that a security mode has not been initiated for that domain, then the message can be processed by the mobile device. By differentiating between security modes in different domains, dropped calls can be decreased—especially for situations where layer 3 messages in one domain are received after integrity protection initiation messages from another domain, which is very possible when PS and CS connections are being set up concurrently.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, and the like, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. A security mode method comprising:
   receiving, at a mobile station, a layer 3 message in a first domain from a network;
   determining, by the mobile station, if the layer 3 message has integrity protection information;
   ascertaining, by the mobile station, if a security mode has been initiated in the first domain;
   detecting, by the mobile station, if a security mode has been initiated in a second domain; and
   forwarding the layer 3 message to an upper layer of the mobile station, if the layer 3 message lacks integrity protection information and a security mode has not been initiated in the first domain and has been initiated in the second domain.

2. A security mode method according to claim 1 further comprising:
   performing, at the mobile station, integrity protection on the layer 3 message, if the layer 3 message has integrity protection information.

3. A security mode method according to claim 1 further comprising:
   discarding the layer 3 message, by the mobile station, if the layer 3 message lacks integrity protection information and a security mode has been initiated in the first domain.

4. A security mode method according to claim 1 wherein the first domain is a circuit-switched domain and the second domain is packet-switched domain.

5. A security mode method according to claim 1 wherein the first domain is a packet-switched domain and the second domain is circuit-switched domain.

6. A security mode method according to claim 1 wherein determining, by the mobile station, if the layer 3 message has integrity protection information comprises:
   checking for an information element "Integrity check info."

7. A security mode method according to claim 1 wherein ascertaining, by the mobile station, if a security mode has been initiated in the first domain comprises:
   checking for receipt of an integrity protection initiation command message in the first domain.

8. A security mode method according to claim 1 wherein detecting, by the mobile station, if a security mode has been initiated in a second domain comprises:
   checking for receipt of an integrity protection initiation command message in the second domain.

9. A security mode method according to claim 1 wherein ascertaining, by the mobile station, if a security mode has been initiated in the first domain comprises:
   checking a variable for a value that indicates that integrity protection has started in the first domain.

10. A security mode method according to claim 1 wherein detecting, by the mobile station, if a security mode has been initiated in a second domain comprises:
    checking a variable for a value that indicates that integrity protection has started in the second domain.

11. A security mode method according to claim 1 wherein the upper layer is a mobility management layer for the first domain.

12. A security mode method comprising:
    establishing a radio resource control connection between a mobile station and a network;
    receiving, at the mobile station, a security mode initiation message for a first domain from the network;
    completing, by the mobile station, security mode initiation;
    receiving, at the mobile station, a layer 3 message for a second domain from the network; and
    forwarding the layer 3 message to a mobility management layer of the mobile station for the second domain.

13. A security mode method according to claim 12 wherein the first domain is circuit-switched and the second domain is packet-switched.

14. A security mode method according to claim 12 wherein the first domain is packet-switched and the second domain is circuit-switched.

15. A security mode method according to claim 12 wherein the layer 3 message is an authentication request.

16. A security mode method according to claim 15 wherein the layer 3 message is an authentication request for a circuit-switched domain.

17. A security mode method according to claim 15 wherein the authentication request is an authentication & ciphering request for a packet-switched domain.

18. A security mode method according to claim 12 further comprising:
    receiving, at the mobile station, a layer 3 message for the first domain from the network, before receiving a security mode initiation message for a first domain from the network.

19. A security mode method according to claim 12 further comprising:
    receiving, at the mobile station, a security mode initiation message for the second domain from the network.

* * * * *